018# United States Patent [19]

Dorsett et al.

[11] Patent Number: 4,487,815
[45] Date of Patent: Dec. 11, 1984

[54] TEMPERATURE RESISTANT COATING COMPOSITE

[75] Inventors: Terry E. Dorsett, Painesville; David P. Rininger, Fairport Harbor, both of Ohio

[73] Assignee: Diamond Shamrock Chemicals Company, Dallas, Tex.

[21] Appl. No.: 473,009

[22] Filed: Mar. 7, 1983

[51] Int. Cl.³ .................. B32B 9/06; C23F 7/00; C09D 5/10
[52] U.S. Cl. .................. 428/219; 428/450; 428/552; 428/546; 428/558; 428/560; 148/6.2; 148/6.14 R; 148/6.27; 427/404; 427/405; 427/406
[58] Field of Search ............... 428/402, 219, 552, 546, 428/558, 560, 450; 148/6.14 R, 6.2, 6.27; 427/404, 405, 406

[56] References Cited

U.S. PATENT DOCUMENTS

| 3,423,229 | 1/1969 | Kompanek et al. | 117/62 |
| 3,656,975 | 4/1972 | Phelps, Jr. et al. | 106/1 |
| 3,907,608 | 9/1975 | Barrett et al. | 148/6.2 |
| 4,229,495 | 10/1980 | Takahashi et al. | 428/36 |
| 4,266,975 | 5/1981 | Higashiyama et al. | 106/1.12 |
| 4,365,003 | 12/1982 | Danforth et al. | 428/552 |

FOREIGN PATENT DOCUMENTS 125239  1/1978  Japan .

Primary Examiner—Patricia C. Ives
Attorney, Agent, or Firm—John J. Freer

[57] ABSTRACT

Temperature resistant substrates, and particularly metals such as ferrous metals, coated for corrosion resistance with coatings containing particulate metal and hexavalent chromium-providing substance can now be made further corrosion resistant, as well as having excellent heat resistance, with a coating composite. In the composite, the undercoating contains a boric acid component plus substantial amounts of finely-divided aluminum as particulate metal. As an adjacent top layer, a coating containing silica substance is used.

16 Claims, No Drawings

TEMPERATURE RESISTANT COATING COMPOSITE

BACKGROUND OF THE INVENTION

Most simplistically it has been known to protect ferrous surfaces by mixing hexavalent chromium compounds and silicate materials in the same coating composition. These can typically be emulsions containing resinous materials. Emulsives may include polyacrylic acid, and coating operations can proceed in conventional manner to achieve corrosion protection for the ferrous surface.

A more complex approach to the protection of substrates has attempted to involve the combination of particulate aluminum plus zinc metals, along with a silicate in a single coating composition. Occasionally the use of some form of chromium is employed, but this can require the deletion of one or more of the first mentioned ingredients.

Specifically, in providing for the more complex systems, it has been found suitable to add to aqueous solutions of alkali metal silicate containing dissolved chromate, the ingredients aluminum powder and zinc oxide. That is, particulate zinc is not employed. Rather, zinc oxide is found compatible. Coated metals, particularly ferrous metals, after coating and heat curing of applied coating, are found to have corrosion and abrasion resistance, as taught in U.S. Pat. No. 3,656,975.

If the deletion of chromium is considered, then it has been taught in U.S. Pat. No. 3,423,229 to combine pulverulent zinc and aluminum in a coating composition of soluble metal silicate. After application, the coating can be cured to water insolubility by the subsequent application of an acid solution. Or, if careful attention is directed to the proper mix of aluminum and zinc powder, and these are further combined with a $C_{1-4}$-alkyl silicate, in appropriate proportion, the coating can be heat cured. On topcoating with a finishing powder paint, a coating of heat resistance plus water resistance is taught in U.S. Pat. No. 4,229,495.

Looking more particularly at two coat systems, it has been known in the protection of zinc surfaces to first treat the surface with a traditional chromate undercoating, and then topcoat the treated surface with colloidal silicas or silicate solutions. This protection against white rusting can be obtained with films such as from silicate solutions of sodium silicate and/or potassium. In addition to retarding white rusting, the topcoating can also retard staining as has been discussed in Japanese Patent Disclosure No.: Showa 53-125239.

In focusing on undercoatings, it is known to use substantially resin free, chromium-containing coatings for protecting ferrous substrates. Of special interest are those which contain particulate metal. Representative coating compositions can have a portion of the chromic acid constituent replaced by a boric acid component as disclosed in U.S. Pat. No. 4,266,975. Other complex compositions such as shown in U.S. Pat. No. 3,907,608 and which may contain the pulverulent metal and hexavalent-chromium-providing substance in a liquid medium comprising water plus high-boiling organic liquid, have been recently shown to be most useful coatings over ferrous surfaces when provided with a silicate topcoating, as has been disclosed in U.S. Pat. No. 4,365,003.

SUMMARY OF THE INVENTION

It has now been found that substrates, and especially ferrous substrates, protected as described hereinabove with resin free compositions of particulate metal and hexavalent-chromium-providing substance, can have outstanding corrosion protection against rust, in both exposure to salt conditions and weathering conditions, even when subjected to severe heating/cooling cycling. Such substrates of improved protection are now achieved using silica topcoatings over undercoatings containing a boric acid component, plus special particulate metal combination. Corrosion resistance improvement, as demonstrated against salt solutions, can be extraordinary, even where temperature cycles include rapid quenching following exposure to elevated temperatures.

Moreover, the present invention obtains such effects in straight-forward coating operation. And in addition to such corrosion resistance obtained after temperature cycling, the coating composite provides other characteristics including augmented mar resistance, achieved without sacrifice to further desirable features, e.g., coating adhesion.

The foregoing aspects of the invention are now achieved as a heat-resistant and corrosion-resistant coated substrate protected with a coating composite containing particulate metal, wherein at least two adjacent layers of the coating composite are substantially resin free and comprise an undercoating and a topcoating, with the undercoating containing the particulate metal, each coating being established from compositions curable to water resistant protective coatings, with the undercoating being applied as a substantially resin free composition containing, in liquid medium, a hexavalent-chromium-providing substance, boric acid component, and particulate zinc plus particulate aluminum. The aluminum provides greater than 15, but less than 85 percent, by weight of the combined particulate zinc and aluminum and the undercoating is applied in an amount sufficient to provide, upon curing, above 10 but not substantially above about 5000 milligrams per square foot of coated substrate of particulate metal. The topcoating is applied as a substantially resin free as well as particulate metal free composition containing silica substance in liquid medium in an amount sufficient to provide above about 50 milligrams per square foot of coated substrate of silica substance in cured topcoating.

DESCRIPTION OF THE PREFERRED EMBODIMENTS

The undercoatings by themselves can form corrosion resistant coatings on the substrate surface after curing at elevated temperature. The undercoating compositions most simplisticly, will contain a boric acid component, a hexavalent-chromium-providing substance and particulate metal that will include a substantial dose of particulate aluminum along with pulverulent zinc.

Particularly preferred undercoat compositions, for enhanced coating adhesion as well as corrosion resistance, will contain thickeners, such as water soluble cellulose ethers and will also contain high boiling organic liquid. For economy, these particular coating compositions preferably contain between about 0.01-3 weight percent of water soluble cellulose ether, such as hydroxyethylcellulose, methylcellulose, methylhydroxypropylcellulose, ethylhydroxyethylcellulose, methylethylcellulose or mixtures of these substances. Although the cellulose ether needs to be water soluble to augment thickening for these particular coating compositions, it need not be soluble in the high boiling organic liquid, which liquid can contribute up to 50 volume percent of the preferred undercoating composition based on the total volume of liquid in the coating composition. Such organic liquid, when present, also can supply substantially above about 5 volume percent, and advantageously above about 15 volume percent, both on the same basis as for the 50 volume percent, of the coating composition liquid.

For the particularly preferred undercoat compositions, the organic liquid has a boiling point at atmospheric pressure above 100° C., while preferably being water soluble. The organic liquids contain carbon, oxygen and hydrogen and have at least one oxygen-containing constituent that may be hydroxyl, or oxo, or a low molecular weight ether group, i.e., a $C_1$–$C_4$ ether group, so that for convenience such liquids can be referred to as "oxohydroxy liquids." Since water dispersibility and preferably water solubility is sought, polymeric hydrocarbons are not particularly suitable and advantageously serviceable hydrocarbons contain less than about 15 carbon atoms. Particular hydrocarbons which may be present in these preferred undercoating compositions include tri-, and tetraethylene glycol, di- and tripropylene glycol, the monomethyl, dimethyl, and ethyl ethers of these glycols, as well as diacetone alcohol, the low molecular weight ether of diethylene glycol, and mixtures of the foregoing.

The particulate metal of the undercoating must contain finely divided zinc and pulverulent aluminum, but may also contain a minor amount, not to exceed about 40 weight percent, and usually less than 25, but more typically less than 10, weight percent or less, basis total particulate metal, of other electrically conductive metallic pigment such as finely divided manganese, nickel, cadmium, steel, stainless steel or magnesium and ferroalloys such as ferromanganese and ferrochrome and further including such as ferrophosphorous. The particulate metal is often an atomised and condensed powder, but is most particularly zinc flake and aluminum flake. Flake may be blended with pulverulent metal powder, but typically in only minor amounts of powder. The metallic powders generally have particle size such that all particles pass 100 mesh and a major amount pass 325 mesh ("mesh" as used herein is U.S. Standard Sieve Series). The powders may be spherical as opposed to the leafing characteristic of the flake.

For the combined pulverulent zinc and aluminum content, the aluminum will be present in an amount greater than 15 weight percent to provide enhanced corrosion protection under severe heat cycling conditions. On the other hand, for similar protection, the aluminum will not contribute more than 85 weight percent of the zinc and aluminum total. Advantageously, the aluminum will provide from about 25 to about 75 weight percent of the zinc and aluminum combination, while preferably for best corrosion resistance the aluminum in present in an amount not exceeding about 65 weight percent of such combination.

The hexavalent-chromium-providing substance can be chromic acid or its equivalent in aqueous medium, for example, chromium trioxide or chromic acid anhydride. But such chromium can be supplied by a salt such as ammonium dichromate, or by sodium or potassium salts, or by substances such as calcium, barium, magnesium, zinc, cadmium, and strontium dichromate or chromate. Additionally, a minor amount such as on the order of about 40 percent or less of the hexavalent-chromium-providing substance might be a mixed chromium compound, i.e., include trivalent chromium compounds. Although the aqueous composition might contain only a small amount, e.g., 5 grams per liter of hexavalent chromium, expressed as $CrO_3$, and may contain as much as about 100 grams per liter of composition of hexavalent chromium, expressed as $CrO_3$, it will typically contain between about 20–60 grams.

For supplying the liquid medium, without considering the contribution by the high boiling organic liquid, water virtually always supplies the whole amount. Other liquids may possibly be used, but preferably only a very minor amount of the aqueous medium, basis the high boiling organic liquid free medium, is such other liquid material. Such other liquids that might be contemplated include alcohols, most notably t-butanol, and halogenated hydrocarbon liquid, some of which have been discussed in U.S. Pat. Nos. 2,762,732 and 3,437,531.

For the "boric acid component" as the term is used herein, it is convenient to use orthoboric acid commercially available as "boric acid," although it is also possible to use various products obtained by heating and dehydrating orthoboric acid such as metaboric acid, tetraboric acid and boron oxide. Moreover usually only as a minor amount, although it can be more, there can be used salts, e.g., up to forty weight percent or more of the boric acid component may be supplied by borax, zinc borate or the like. The boric acid should be present in an amount from about 0.4 weight percent up to saturation in the composition. Advantageously for efficient corrosion resistance the composition will contain from about 0.5 to 3 weight percent boric acid component.

The preferred undercoat compositions will contain a pH modifier, which is able to adjust the pH of the final mixture to within the range of from 3.0 to 6.0. The pH modifier is generally selected from the oxides and hydroxides of alkali metals, although lithium is the preferred alkali metal for enhanced coating integrity; or, is selected from the oxides and hydroxides of the metals belonging to the groups IIA and IIB and groups of larger numbers in the periodic table, which compounds are soluble in aqueous chromic acid solution such as strontium, calcium, barium, magnesium, zinc and cadmium. The pH modifier may also be a compatible carbonate of the foregoing metals, by which is meant the carbonate will be soluble in aqueous chromic acid solution without causing initial, significant chrome reduction, while readily yielding a solution pH above 7 when dissolved in water alone. The pH modifier need not be used when the chromic acid constituent is not strongly acidic.

In the preferred undercoating compositions, for the purpose of helping the dispersion of the particulate metal, it is possible to add a nonionic dispersing agent, i.e., surfactant, serving as a wetting agent, particularly such as alkylphenol polyethoxy adduct, for example. The amount of such surfactant is typically 0.01 to 1 weight percent of the final mixture.

The undercoating weight on the coated substrate may vary to a considerable degree but, exclusive of the particulate metal, will most typically always be present in an amount supplying above about 2 milligrams per square foot of chromium, expressed as chromium and not $CrO_3$. For extended corrosion resistance, such may contain up to about 500 milligrams per square foot of chromium. Generally, the coating should have a weight ratio of chromium, expressed as chromium and not $CrO_3$, to pulverulent metal of less than about 0.5:1, and such ratio is most usually for the less heavy coatings weights, since as the coating weight approaches, for example 5000 milligrams per square foot of pulverulent metal, the weight ratio of chromium to pulverulent metal will be less than about 0.2:1. For such less heavy coatings, the undercoating will often contain about 10–200 milligrams per square foot of coated substrate of pulverulent metal.

Other compounds may be present in the undercoating composition, but even in combination are present in very minor amounts, such as on the order of 10 grams per liter or less for the undercoating, so as not to deleteriously affect the coating integrity, e.g., with respect to electroconductivity and galvanic protection. The undercoating should be substantially resin free; and this is exclusive of any thickening and/or dispersing agents which may be present. To be substantially resin free, the undercoating compositions should contain less than about 10 grams per liter of resin and preferably are completely resin free.

The protected substrate can be any substrate, e.g., a ceramic or similar substrate, but is most particularly a metal substrate, an important consideration being that any such substrate withstand the heat curing conditions for the coatings, which need, however, not be as severe as the heat conditions under which the coated substrate might serve. Especially where such are metal substrates, which are most usually ferrous substrates, these may be pretreated, e.g., by chromate or phosphate treatment, prior to application of the undercoating. After undercoating application, it is preferred for best corrosion resistance to subsequently heat cure the applied coating. However, volatile coating substituents may be simply vaporized from the applied coating, e.g., drying without curing, before topcoat application. Cooling after drying, or extensive cooling after heat curing, may be obviated. The preferred temperature for heating, which is also often referred to as curing and which may be preceded by drying such as air drying, is within the range from about 350° F. at a pressure of 760 mm Hg up to not essentially above about 1000° F. Preheating the substrate prior to application of the undercoat composition will assist in achieving cure temperature. However, such curing temperatures do not often exceed a temperature within the range of about 450°–700° F. At the elevated curing temperatures, the heating can be carried out in as rapidly as about a few seconds, but curing is often conducted for several minutes at a reduced temperature.

The term "silica substance" as it is used herein for the topcoating is intended to include both silicates and colloidal silicas. The colloidal silicas include both those that are solvent based as well as aqueous systems with the water based colloidal silicas being most advantages for economy. As is typical, such colloidal silicas can include additional ingredients, e.g., thickeners as, for example, up to about 5 weight percent of an above-discussed water soluble cellulose ether. Also, a minor amount, e.g., 20–40 percent by weight and usually a lesser amount, of the colloidal silicas can be replaced by colloidal alumina. In general, the use of colloidal silicas will provide for heavier topcoats of silica substance over undercoated substrate materials. It is contemplated to use colloidal silicas containing up to 50 percent by weight by solids, but typically, much more concentrated silicas will be diluted, for example, where spray application of the topcoat will be used. Advantageously, for economy, such dilution provides colloidal silicas containing not less than 1 to 2 weight percent solids. Most advantageously for achieving desirable topcoating weights combined with ease of application, such colloidal silicas will contain from about 5 weight percent to about 40 weight percent solids.

When the topcoating silica substance is silicate, it may be organic or inorganic. The organic silicates that can be, or have been, useful include the alkyl silicates, e.g., ethyl, propyl, butyl and polyethyl silicates, as well as alkoxyl silicates such as ethylene glycol monoethyl silicate, tetra isobutyl silicate and tetra isopropyl silicate, and further including aryl silicates such as phenyl silicates. Most generally for economy, the organic silicate is ethyl silicate. Advantageously, the inorganic silicates are used for best economy and corrosion resistance performance. These are typically employed as aqueous solutions, but solvent based dispersions may also be used. When used herein in reference to silicates, the term "solution" is meant to include true solutions and hydrosols. The preferred inorganic silicates are the aqueuos silicates that are the water soluble silicates including sodium, potassium, lithium, sodium/lithium combinations, as well as other related combinations, and ammonium including quaternary ammonium as well as mixtures of the foregoing. Referring to sodium silicate as representative, the mole ratios of $SiO_2$ to $Na_2O$ generally range between 1:1 and 4:1. It is preferred to use, for economy, those silicates which are most readily commercially available, generally having a mole ratio of $SiO_2$ to $Na_2O$ of from about 1.8:1 to about 3.5:1. For best efficiency and economy, an aqueous based sodium silicate is preferred as the silica substance.

Other ingredients may be present in the topcoating composition, e.g., wetting agents and colorants, but the composition should be substantially resin free, as such is defined hereinabove. Also, it will be particulate-metal-free. Substances that may be present can further include thickening and dispersing agents as well as pH adjusting agents, but all such ingredients will typically not aggregate more than about five weight percent, and usually less, of the topcoating composition so as to provide for enhanced coating composition stability coupled with augmented coating integrity.

The silicate should contain from at least 0.5 weight percent solids, and may contain up to about 50 weight percent solids or more. Advantageously, for efficiency in achieving a desirable coating weight, the silicate will contain at least about 1 weight percent solids. It is conventional in the industry for some coating applications to remove excess coating by rapidly rotating freshly coated parts maintained in a basket. This is usually referred to as the "dip spin" coating method, as the coating is typically first achieved by placing fresh parts for coating in the basket and then dipping same into coating composition. For efficient coatings regardless of coating operation technique, it is preferred that the silicate contain above about 10 weight percent solids up to about 40 weight percent.

The silica substance topcoating may be applied by various techniques such as immersion techniques including dip drain and dip spin procedures. Where parts are compatible with same, the coating can be by curtain coating, brush coating or roller coating and including combinations of the foregoing. It is also contemplated to use spray technique as well as combinations, e.g., spray and spin and spray and brush techniques. Coated articles that are at elevated temperature, as from curing of the undercoating, can be topcoated without extensive intermediate cooling by a procedure such as dip spin, dip drain or spray coat. By such operation, some to all of the topcoat curing is achieved without further heating.

By any coating procedure, the topcoat should be present in an amount above about 50 mgs./sq.ft. of coated substrate. This is for the cured silica substance topcoating. For economy, topcoat weights for cured topcoating will not exceed about 2000 mgs./sq.ft. Most typically, the heavier coating weights, e.g., from about 500–1500 mgs./sq.ft. of coated substrate will be provided by the colloidal silicas. The silicate topcoating compositions will most typically provide from about 100–1000 mgs./sq.ft. of coated substrate of cured silicate topcoating. Preferably, for best efficiency and economy, the topcoat is an inorganic silicate providing from about 200 to about 800 mgs./sq.ft. of cured silicate topcoating.

For the curing, it is typical to select the curing conditions in accordance with the particular silica substance used, it being important that the topcoating be cured from a water sensitive coating to one that is water resistant. For the colloidal silicas, air drying may be sufficient; but, for efficiency, elevated temperature curing is preferred for all of the silica substances. The elevated temperature curing can be preceded by drying, such as air drying. Regardless of prior drying, lower cure temperature, e.g., on the order of about 150° F. to about 300° F. will be useful for the colloidal silicas and organic silicates. For the inorganic silicates, curing typically takes place at a temperature on the order of about 300° F. to about 500° F. Thus, in general, cure temperatures on the order of from about 150° F. to about 800° F. are useful. Cure temperatures reaching above about 800° F. are uneconomical and undesirable. For best cure efficiency, the topcoats are typically cured at temperatures within the range from about 200° F. to about 500° F. The more elevated temperatures, e.g., on the order of about 500° F. to about 800° F. can be serviceable to likewise cure the undercoat during topcoat cure, but such single cure procedure is not preferred for best corrosion protection of the coated substrate.

Before coating, it is in most cases advisable to remove foreign matter from the substrate surface, as by thoroughly cleaning and degreasing. Degreasing may be accomplished with known agents, for instance, with agents containing sodium metasilicate, caustic soda, carbon tetrachloride, trichlorethylene, and the like. Commercial alkaline cleaning compositions which combine washing and mild abrasive treatments can be employed for cleaning, e.g., an aqueous trisodium phosphate-sodium hydroxide cleaning solution. In addition to cleaning, the substrate may undergo cleaning plus etching.

The following examples show ways in which the invention has been practiced but should not be construed as limiting the invention. In the examples, the following procedures have been employed:

Preparation of Test Parts

Test parts are typically prepared for coating by first immersing in water which has incorporated therein 2–5 ounces of cleaning solution per gallon of water. The alkaline cleaning solution is a commercially available material of typically a relatively major amount by weight of sodium hydroxide with a relatively minor weight amount of a water-softening phosphate. The bath is maintained at a temperature of about 140°–160° F. Thereafter, the test parts are scrubbed with a cleaning pad which is a porous, fibrous pad of synthetic fiber impregnated with an abrasive. After the cleaning treatment, the parts are rinsed with warm water and may be dried.

Application of Coating to Test Parts and Coating Weight

Clean parts are typically coated by dipping into coating composition, removing and draining excess composition therefrom, and then immediately baking or air drying at room temperature until the coating is dry to the touch and then baking. Baking proceeds in a hot air convection oven at temperatures and with times as specified in the examples.

Coating weights for parts, generally expressed as a weight per unit of surface area, are typically determined by selecting a random sampling of parts of a known surface area and weighing the sample before coating. After the sample has been coated, it is reweighed and the coating weight per selected unit of surface area, most always presented as milligrams per square foot (mg./sq.ft.), is arrived at by straightforward calculation.

Corrosion Resistance Test (ASTM B 117-73) and Rating

Corrosion resistance of coated parts is measured by means of the standard salt spray (fog) test for paints and varnishes ASTM B 117-73. In this test, the parts are placed in a chamber kept at constant temperature where they are exposed to a fine spray (fog) of a 5 percent salt solution for specified periods of time, rinsed in water and dried. The extent of corrosion on the test parts is determined by comparing parts one with another, and all by visual inspection.

EXAMPLE 1

To 55 milliliters (mls.) of dipropylene glycol (DPG), there is blended with moderate agitation 1.0 ml. of a nonionic wetter having a viscosity in centipoises at 25° C. of 280 and a density at 25° C. of 10 pounds per gallon, and 1.0 gram (gm.) of hydroxypropyl methyl cellulose thickener. The thickener is a very finely-divided cream to white colored powder. To this thickener mixture there is then added 87.1 gms. of a flaked zinc/aluminum mixture, providing 78.3 gms. zinc and 8.8 gms. aluminum, using agitation during the addition. The zinc flake has particle thickness of about 0.1–0.5 micron and a longest dimension of discrete particles of about 80 microns. This provides approximately 10 weight percent aluminum in the flake mixture.

Separately there is added to 88 ml. of deionized water 12.5 gms. of $CrO_3$, and to this there is added an additional 88 ml. of deionized water. To this chromic acid solution is added about 3 gms. of zinc oxide. The resulting chromic acid solution is slowly added to the metal flake dispersion to form a standard undercoating composition.

To prepare compositions of varying ingredients, the procedure for the standard composition is used with the following changes. To vary the aluminum content, the particulate metal added to the thickener mixture is simply adjusted accordingly. Various particulate aluminum amounts are shown in the table below; in each formulation, the total volume of pulverulent metal is the same.

To provide boric acid, such is merely added in the make-up of the chromic acid solution. Again, added amounts are shown in the table below.

For the topcoat, there is employed a commercially available sodium silicate having 39.3 weight percent solids in a water medium and a ratio of $SiO_2/Na_2O$ of 3.22, to which there is added an equal weight of deionized water and to this diluted solution there is added 0.02 weight percent of nonionic polyol surfactant having an average molecular weight of 1100, a specific gravity of 1.02 and a flash point of 439° F.

The parts for testing are all 4×8 inch test panels that are all cold-rolled, low-carbon steel panels. These panels are cleaned and coated, initially with one of the undercoating formulations, and then the undercoated panels are topcoated, all in the manner described hereinbefore. After coating with the undercoating, panels are baked for 10 minutes in a convection oven having a hot air temperature of 200° F., followed by such baking, again for 10 minutes, but at a hot air temperature of 575° F. Topcoated panels are also thusly baked, but at an air temperature of 350° F. and for 10 minutes.

Coated panels are then subjected to high temperature testing. For this, the panels are placed for one hour in a convection oven having a hot air temperature of 800° F. Upon removal from the oven, the panels are quenched in a room temperature, five weight percent strength sodium chloride solution. Then the panels are returned to the oven and the heating/quenching cycle repeated. Each panel is subjected to three of these heat/quench cycles, after which each panel is simply air dried.

Panels are then subjected to the hereinbefore described corrosion resistance test. Pertinent coating and testing results are summarized hereinbelow in the table.

TABLE 1

| Sample | Boric Acid Concentration* | Al Flake Concentration** | Coating Weight Undercoat | Topcoat | Salt Spray % Corrosion+ |
|---|---|---|---|---|---|
| Comparative | 0 | 10% | 1976 | 473 | 55 |
| Comparative | 18 | 10% | 2104 | 449 | 65 |
| Comparative | 0 | 50% | 1470 | 487 | 15 |
| Example | 18 | 50% | 1575 | 472 | <3 |

*Expressed in grams per liter of undercoating composition.
**Expressed as weight percent, basis total weight of particulate aluminum and zinc in the undercoating composition.
+ Panel field corrosion, 984 hour test.

EXAMPLE 2

To prepare compositions of varying ingredients, the standard composition of Example 1 is used along with the procedures of Example 1 for varying the aluminum content and to provide the boric acid. Various particulate aluminum amounts as well as resultant coating weights are shown in the table below; in each formulation, the total volume of pulverulent metal is the same. Also, each formulation contains 18 grams per liter of boric acid.

For the topcoat, there is employed a commercially available sodium silicate having 39.3 weight percent solids in a water medium and a ratio of $SiO_2/Na_2O$ of 3.22, to which there is added an equal weight of deionized water and to this diluted solution there is added 0.02 weight percent of nonionic polyol surfactant having an average molecular weight of 1100, a specific gravity of 1.02 and a flash point of 439° F.

The parts for testing are all 4×8 inch test panels that are all cold-rolled, low-carbon steel panels. These panels are cleaned and coated, initially with one of the undercoating formulations, and then the undercoated panels are topcoated, all in the manner described hereinbefore. After coating with the undercoating, panels are baked for 10 minutes in a convection oven having a hot air temperature of 200° F., followed by such baking, again for 10 minutes, but at a hot air temperature of 575° F. Topcoated panels are also thusly baked, but at an air temperature of 350° F. and for 10 minutes. Topcoating weights are not measured but are believed to be all in the range of from 450 to 550 milligrams per square foot based upon similar experience.

Coated panels are then subjected to high temperature testing. For this, the panels are placed for one hour in a convection oven having a hot air temperature of 800° F. Upon removal from the oven, the panels are quenched in a room temperature, five weight percent strength sodium chloride solution. Then the panels are returned to the oven and the heating/quenching cycle repeated. Each panel is subjected to three of these heat/quench cycles, after which each panel is simply air dried.

Panels are then subjected to the hereinbefore described corrosion resistance test. Pertinent coating and testing results are summarized hereinbelow in the table.

TABLE 2

| Sample | Al Flake Concentration* | Undercoat Coating Weight | Salt Spray % Corrosion+ |
|---|---|---|---|
| Comparative | 15% | 1865 | 7 |
| Example | 35% | 1597 | 0 |
| Example | 65% | 1429 | 1 |
| Comparative | 85% | 1352 | .8 |

*Expressed as weight percent, basis total weight of particulate aluminum and zinc in the undercoating composition.
+ Panel field corrosion, 336 hour test.

What is claimed is:

1. A heat-resistant and corrosion-resistant coated substrate protected with a coating composite containing particulate metal, wherein at least two adjacent layers of the coating composite are substantially resin free and comprise an undercoating and a topcoating, with the undercoating containing said particulate metal, each coating being established from compositions curable to water resistant protective coatings, with the undercoating being applied as a substantially resin free composites containing, in liquid medium, a hexavalent-chromium-providing substance, boric acid component, and particulate zinc plus particulate aluminum, with the aluminum providing greater than 15, but less than 85 percent, by weight of combined particulate zinc and aluminum and with said undercoating being applied in an amount sufficient to provide, upon curing, above 10 but not substantially above about 5000 milligrams per square foot of coated substrate of particulate metal, and with said topcoating being applied as a substantially resin free as well as particulate metal free composition containing silica substance in liquid medium in an amount sufficient to provide above about 50 milligrams per square foot of coated substrate of silica substance in cured topcoating.

2. The coated substrate of claim 1 wherein said undercoating is the first coating on the surface of such substrate.

3. The coated substrate of claim 1 wherein the liquid medium of both said undercoating and said topcoating compositions contains water.

4. The coated substrate of claim 3 wherein said undercoating liquid medium comprises water plus high-boiling organic liquid.

5. The coated substrate of claim 1 wherein said undercoating is established from a heat-curable composition containing a boric acid component in an amount from about 0.4 percent by weight of said composition up to saturation of said component.

6. The coated substrate of claim 5 wherein said chromic acid constituent is selected from the group consisting of chromic acid, water-soluble metal salts of chromic acid, and mixtures thereof.

7. The coated substrate of claim 5 wherein said boric acid component is selected from the group consisting of orthoboric acid, metaboric acid, tetraboric acid and boron oxide.

8. The coated substrate of claim 1 wherein at least a portion of the particulate metal of said undercoating is in flake form.

9. The coated substrate of claim 1 wherein said undercoating contains not above about 500 milligrams per square foot of coated substrate of chromium, with the coating containing a weight ratio of chromium, as chromium, to particulate metal of not substantially above about 0.5:1.

10. The coated substrate of claim 1 wherein said topcoating upon curing provides not substantially above about 2000 milligrams per square foot of coated substrate of said silica substance.

11. The coated substrate of claim 1 wherein said aluminum provides greater than 25 percent, but less than 75 percent, by weight, of the combined particulate zinc and aluminum in said undercoating.

12. The coated substrate of claim 11 wherein said aluminum provides less than about 65 percent by weight of the combined particulate zinc and aluminum.

13. The method of protecting a substrate with a heat-resistant as well as corrosion-resistant coating, which method comprises:

(a) establishing a substantially resin free, hexavalent-chromium-containing coating composition in liquid medium;

(b) admixing with said coating composition a boric acid component;

(c) providing said coating composition with a particulate metal constituent containing particulate zinc plus particulate aluminum wherein aluminum provides greater than 15, but less than 85 percent, by weight, of the combined particulate zinc plus aluminum;

(d) applying the resulting coating composition to the substrate as an undercoating in an amount sufficient to provide, upon curing, above 10 but not substantially above about 5000 milligrams per square foot of coated substrate of particulate metal;

(e) vaporizing volatile substituents from said undercoating;

(f) applying a particulate metal free as well as substantially resin free topcoating composition, containing silica substance in liquid medium, on the undercoated substrate and in an amount sufficient to provide above about 50 milligrams per square foot of coated substrate of silica substance in cured topcoating; and (g) curing said applied topcoating.

14. The method of claim 13 wherein said volatile substituents are vaporized in step (e) by subjecting said undercoating to elevated temperature for a sufficient time to cure said undercoating.

15. The method of claim 13 wherein said volatile substituents are vaporized from the undercoating by heating at a temperature above about 350° F. and said topcoating is cured by heating at a temperature within the range from about 200° F. to about 800° F.

16. The method of claim 13 wherein said undercoating is established as a dry and water-resistant undercoating by vaporizing volatile substituents at elevated temperature, and said topcoating is thereafter applied without intermediate cooling.

* * * * *